United States Patent [19]

Dillehay et al.

[11] Patent Number: 5,587,552
[45] Date of Patent: Dec. 24, 1996

[54] INFRARED ILLUMINATING COMPOSITION

[75] Inventors: David R. Dillehay; David W. Turner, both of Marshall, Tex.

[73] Assignee: Thiokol Corporation, Ogden, Utah

[21] Appl. No.: 150,427

[22] Filed: Nov. 9, 1993

[51] Int. Cl.⁶ ................................................. C06B 45/10
[52] U.S. Cl. ........................ 149/19.5; 149/19.1; 149/19.6; 149/19.91; 149/38; 149/49; 149/116; 102/336
[58] Field of Search .................................. 149/46, 52, 61, 149/108.2, 87, 92, 116, 17, 19.91, 19.1, 19.5, 19.6, 19.92

[56] References Cited

U.S. PATENT DOCUMENTS

| | | | |
|---|---|---|---|
| 2,909,418 | 10/1959 | Pearsall | 52/2 |
| 3,411,964 | 11/1968 | Donda | 149/19 |
| 3,475,237 | 10/1969 | Lane et al. | 149/22 |
| 3,485,169 | 12/1969 | Lai | 102/37.8 |
| 3,617,403 | 11/1971 | Johnson | 149/19 |
| 3,673,013 | 6/1972 | Lane et al. | 149/19 |
| 3,677,842 | 7/1972 | Doris | 149/109 |
| 3,706,611 | 12/1972 | Hastings | 149/44 |
| 3,723,206 | 3/1973 | Dinsdale et al. | 149/19 |
| 3,733,223 | 5/1973 | Lohkamp | 149/19 |
| 3,888,177 | 6/1975 | Tyroler | 102/31 |
| 3,895,578 | 7/1975 | Shaw et al. | 102/37.8 |
| 3,951,705 | 4/1976 | Mancinelli et al. | 149/41 |
| 3,954,529 | 5/1976 | Reed et al. | 149/19.6 |
| 3,983,816 | 10/1976 | Cornia et al. | 102/37.8 |
| 3,986,907 | 10/1976 | Dillehay | 149/19.6 |
| 4,078,954 | 3/1978 | Bernardy | 149/19.8 |
| 4,204,895 | 5/1980 | Webster, III | 149/19.6 |
| 4,719,857 | 1/1988 | Spring | 102/335 |
| 4,881,464 | 11/1989 | Sayles | 102/336 |
| 5,056,435 | 10/1991 | Jones et al. | 102/336 |

FOREIGN PATENT DOCUMENTS

| | | | |
|---|---|---|---|
| 2316204 | 7/1975 | France | F42B 4/26 |
| 2346634 | 4/1977 | France | F42B 4/00 |
| 291891 | 5/1916 | Germany . | |
| 840049 | 7/1949 | Germany . | |
| 3506222 | 8/1986 | Germany | C06B 21/00 |
| 1277528 | 10/1970 | United Kingdom . | |
| 1515039 | 6/1976 | United Kingdom . | |
| 1573645 | 4/1977 | United Kingdom . | |
| 2176178 | 12/1986 | United Kingdom . | |

*Primary Examiner*—Charles T. Jordan
*Assistant Examiner*—John R. Hardee
*Attorney, Agent, or Firm*—Madson & Metcalf; Ronald L. Lyons

[57] ABSTRACT

Infrared illuminant compositions are disclosed which produce significant quantities of infrared radiation when burned but which produce very little visible light. The infrared illuminant compositions provide specific illumination in the spectral range visible with night vision devices. The disclosed infrared illuminant compositions include ammonium nitrate as the main oxidizer, an infrared generator such as cesium nitrate, rubidium nitrate, or mixtures thereof, and a fuel. By eliminating potassium and its direct and indirect visible light contributions, from the illuminant compositions, improved concealment indexes are obtained. Other additives, including conventional binders and burn rate modifiers may be used as to tailor the performance and physical characteristics of the infrared illuminant composition.

27 Claims, 1 Drawing Sheet

INFRARED ILLUMINATING COMPOSITION

BACKGROUND OF THE INVENTION

1. The Field of the Invention

The present invention relates to infrared illuminant compositions. More particularly, the present invention is related to infrared illuminating compositions which produce specific illumination in the spectral region observed with infrared image intensifiers with minimal visible light production.

2. Technical Background

Infrared illuminant flares are used to enhance the use of infrared image intensifiers such as night vision goggles. These flares are generally configured in much the same manner as visible light emitting flares. Thus, these flares may provide infrared radiation at a single position on the ground or they may be propelled over the area of interest and ignited to provide radiation above the ground. Generally, it is desirable that such flares radiate predominantly or almost exclusively in the infrared region and produce little or substantially no visible light. It will be appreciated that it is often desirable to conduct operations in a covert manner which avoids illuminating the observer and does not alert the target, or others, to the presence of the flare.

Infrared illuminant compositions and flares have been developed but problems exist. Among the problems encountered is the presence of undesired visible light during burning. In that regard, the performance of infrared emitting devices can be judged by the ratio of infrared light to visible light observed during combustion. This ratio is known as the concealment, or covert, index. The concealment index is low for many conventional infrared emitting compositions, indicating a high proportion of visible light being emitted from the flare.

The alkali metals potassium, cesium, and rubidium are known to generate infrared radiation upon burning. Nitrates of these metals produce low levels of visible light. Thus, known infrared illuminating compositions with good concealment indexes generally comprise one or more of these metal nitrates. Cesium and rubidium exhibit substantially similar properties and are considered generally interchangeable. Some problems encountered include the relative expense of cesium and rubidium compounds and the relatively slower burn rate and lesser infrared efficiency of potassium nitrate. The combination of cesium and potassium nitrate, however, yields cost-effective compositions with satisfactory burn rates, improved infrared efficiency, and low concealment indexes.

Although compositions comprising a combination of cesium nitrate and potassium nitrate have low concealment indexes, the significant relative contribution of the potassium ion to the visible light produced has not been previously recognized. In addition, these compositions produce some black body radiation in the visible range because the volatile metal combustion products increase the burning temperature of the composition. These problems have not been previously addressed in the art.

Ammonium nitrate is an inexpensive and well-known oxidizing material which has been used effectively in various explosives and propellants. Although ammonium nitrate has been suggested for use in conventional illuminating flares, it has been shown to lack effectiveness in these compositions. Ammonium nitrate produces neither infrared nor visible light when burned. Ammonium nitrate has not been used in conventional infrared illuminating flares.

In summary, known infrared emitting compositions have been found to be less than ideal. State of the art compositions combine potassium nitrate and cesium nitrate. The detrimental contribution of potassium to the flame of these compositions, however, has not been previously recognized. In fact, potassium both produces visible light during its combustion and contributes volatile combustion products which increase the visible signature produced by black body radiance.

It would, therefore, be a significant advancement in the art to provide infrared emitting compositions which produce only minimal visible light while providing specific illumination in the spectral range visible with night vision devices. The compositions would provide high levels of infrared emissions yet avoid the visible light contribution due to the presence of potassium in conventional compositions. The compositions provided, therefore, would have improved concealment indexes.

Such compositions are disclosed and claimed herein.

BRIEF SUMMARY OF THE INVENTION

The present invention is related to novel and inventive compositions which produce significant quantities of infrared radiation when burned. At the same time, the compositions avoid some limitations of the existing art.

A major advancement provided by the present invention is the replacement of potassium nitrate with ammonium nitrate as the main oxidizer. The alkali metal component is, therefore, limited to cesium, rubidium, or a mixture thereof. Both cesium and rubidium produce large quantities of infrared radiation when the flare composition is burned. These metals exhibit characteristic radiation wavelength in the near infrared (0.700 to 0.900 microns). The primary radiation comes from this line, whose width has been greatly broadened by the thermal energy in the plume.

Surprisingly, replacement of potassium nitrate with ammonium nitrate in a cesium or rubidium-containing composition provides infrared illuminating compositions which produce specific illumination in the spectral region observed with night vision devices, with minimal visible light production. The ammonium furnishes hydrogen to the flare for fuel and the nitrogen released does not radiate. The nitrogen produced may even serve to reduce undesirable afterburning.

Substitution of ammonium nitrate for potassium nitrate in cesium or rubidium-containing infrared illuminating compositions results in minimal visible light production by at least two mechanisms. First, elimination of potassium nitrate eliminates the visible light produced by potassium during combustion. Second, elimination of volatile metal combustion products lowers the burning temperature of the composition which results in less black body radiation within the visible range. Thus, infrared illuminant compositions with improved concealment indexes are provided.

The basic components of the illuminant compositions include a major proportion of ammonium nitrate, either cesium or rubidium nitrate or both, and a fuel. The ammonium nitrate is present in a range of from about 45% to about 65% by weight of the total composition. To improve burning rate, a nitramine oxidizer can replace from about 5% to about 10% by weight of the ammonium nitrate. The composition contains from about 10% to about 20% by weight cesium nitrate, rubidium nitrate, or mixtures thereof.

The fuel may comprise metallic or organic materials or both. The metallic materials must be limited, however, to avoid or minimize visible light production. The fuel may also be a binder. Other optional ingredients may also be added as is known in the art to tailor the characteristics of the composition to a specific use. Such optional ingredients include binders and burning rate modifiers.

The present invention maintains the capability of tailoring desired physical and performance characteristics by selecting specific combinations of fuels, binders, and additives. For instance, particular burn rates and burn rate curves can be produced, the ratio of infrared radiation to visible light can be optimized, and the general physical and chemical properties can be tailored according to the present invention. Thus, the present invention provides a versatile infrared illuminant material.

DETAILED DESCRIPTION OF THE PREFERRED EMBODIMENTS

Figure 1:
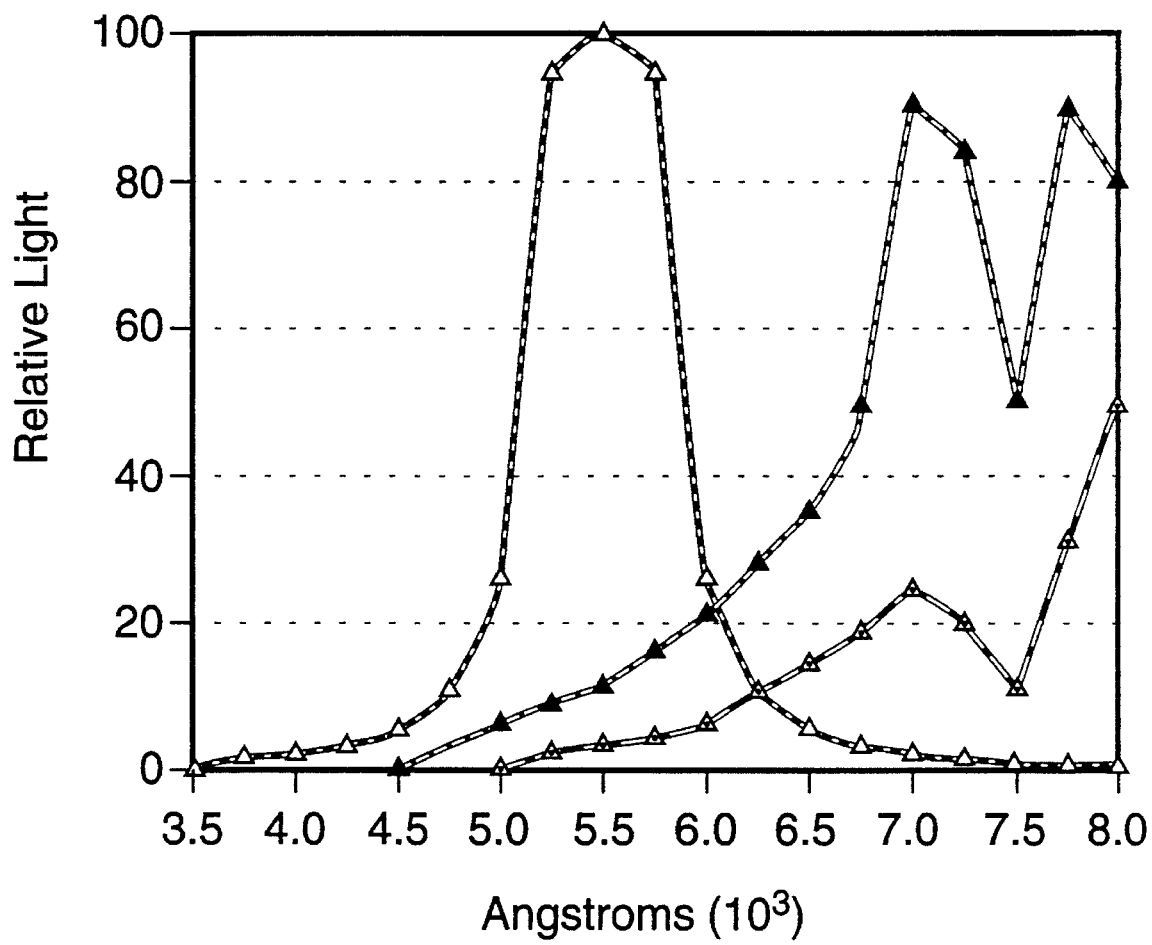
FIG. 1 is a graph of the resonance lines produced by potassium and cesium superimposed on a visual response versus relative light curve.
Figure 1:
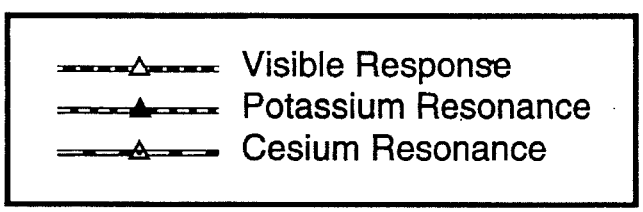

The present invention relates to compositions which produce significant quantities of infrared radiation when burned but which produce very little visible light. The compositions provide specific illumination in the spectral range visible with night vision devices. The unexpected discovery of the present invention is that infrared illuminating compositions for covert illumination of targets can be improved by using an ammonium nitrate oxidizer which contributes essentially no visible light. Therefore, potassium, along with both its direct and indirect visible light contributions, is eliminated from the infrared illuminant compositions of the present invention. Thus, although known infrared illuminant compositions containing potassium possess low concealment ratios, substitution of ammonium nitrate for potassium nitrate provides compositions with dramatically improved concealment indexes. As seen in FIG. 1, both potassium and cesium resonate predominantly in the infrared range. Potassium, however, displays significantly more resonance within the visible range than does cesium. The resonance of rubidium is similar to cesium.

Accordingly, the compositions of the present invention comprise ammonium nitrate as the main oxidizer, either cesium or rubidium nitrate, or both, as the infrared generator, and a fuel. Other additives, including binders and burn rate modifiers are used as is known in the art to tailor other characteristics of the composition. In summary, the present invention provides new and useful illuminant compositions which produce large quantities of infrared radiation, but produce relatively small quantities of visible light.

A typical infrared illuminant composition according to the present invention include the following components in the following percentages by weight:

| Ingredient | Weight Percent |
| --- | --- |
| Infrared emitting material (cesium or rubidium nitrate) | 10–20 |
| Ammonium Nitrate | 45–65 |
| Metal powder(s) | 5–20 |
| Organic Fuel | 10–20 |
| Binder | 5–20 |

Suitable organic fuels include hexamine and melamine. Melamine offers improved storage stability compared to hexamine. Other organic nitrogen containing compounds would also be suitable. Examples include uric acid, guanine, guanidine, and adenine.

Suitable metal powders should release sufficient heat to sustain combustion. The concentration range of metal powders in the composition is more preferably from about 6% to about 12% by weight. Typical metal powders used include boron, zirconium hydride, silicon, tungsten, or mixtures thereof. Zirconium hydride is more stable than, and thus generally preferred over, zirconium metal. In addition, compared to boron, zirconium hydride provides a composition with improved electrostatic discharge sensitivity. Generally, fuels which emit large quantities of visible light, such as aluminum and magnesium, are avoided although very small quantities of these materials could be added as burn rate modifiers.

Suitable binders include various polyesters, polyethers, polyamines, and polyamides as is known in the art. Typical binders may comprise a polyester resin along with an epoxy resin liquid or a vinyl alcohol-acetate resin. The amount and type of binder used will vary depending on the application. For example, pressed compositions generally contain from about 5% to about 8% by weight binder, extruded compositions generally contain from about 8% to about 10% by weight binder, and cast compositions generally contain from about 10% to about 15% by weight binder.

As mentioned above, it is also possible to add combustion rate catalysts and heat sources to the overall composition. These materials provide for further tailoring of the performance characteristics of the resulting composition. These materials, however, must also fit the other parameters of an acceptable composition such as producing little visible light. Two examples of such preferred materials include silicon and boron, while magnesium is not preferred because of its propensity to emit large quantities of visible light. Another preferred example comprises up to about 2% by weight iron oxide as a burn rate modifier.

Compositions within the scope of the present invention can be formulated and prepared using known and conventional technology. Formulation techniques such as those generally employed in mixing and preparing propellant, explosive, and pyrotechnic compositions are preferably used in the preparation of the compositions within the scope of the present invention.

EXAMPLES

The following examples are given to illustrate various embodiments which have been made or may be made in accordance with the present invention. These examples are given by way of example only, and it is to be understood that the following examples are not comprehensive or exhaustive of the many types of embodiments of the present invention which can be prepared in accordance with the present invention.

Example 1

In this example a composition within the scope of the present invention was formulated and tested.

| Ingredient | Weight Percent |
| --- | --- |
| Ammonium nitrate | 59 |

-continued

| Ingredient | Weight Percent |
| --- | --- |
| Cesium nitrate | 10 |
| Iron oxide | 1 |
| Witco Formrez 17-80 | 5 |
| ERL-0510 | 1 |
| Silicon | 7 |
| Hexamine | 15 |
| Boron | 2 |

Witco Formrez 17–80 is the name of a commercially available polyester resin manufactured by Witco Corporation. ERL-0510 is the name of a commercially available epoxy resin liquid manufactured by Ciba Geigy. The binder used in this example is a commonly used curable system.

The above formulation has been tested and provides infrared illumination.

Example 2

An infrared illuminant composition is formulated according to Example 1, except that the curable binder system (Witco Formrez 17–80 polyester resin and ERL-0510 epoxy resin) of Example 1 is replaced with vinyl alcohol-acetate resin (VAAR) to provide a composition that can be pressed into a candle case and does not have a pot-life. A typical commercially available VAAR product is VAAR solids manufactured by Union Carbide-Specialty Chemicals.

Example 3

In this example an infrared illuminant composition within the scope of the present invention is formulated according to Example 1, except that the hexamine is replaced with melamine to provide improved storage stability.

Example 4

In this example an infrared illuminant composition within the scope of the present invention is formulated according to Example 1, except that the boron is replaced with zirconium hydride to provide improved electrostatic discharge sensitivity.

In summary, the present invention provides new and useful infrared illuminant formulations which produce large quantities of infrared radiation, but produce relatively small quantities of visible light. This overcomes some of the major drawbacks of known infrared illuminant compositions. Thus, the infrared illuminant compositions of the present invention represent a significant advancement in the art.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A composition which emits infrared light upon burning comprising:

an infrared emitting material selected from the group consisting of cesium nitrate, rubidium nitrate, and mixtures thereof, said infrared emitting material being present from about 10% to about 20% by weight;

ammonium nitrate present from about 45% to about 65% by weight; and a fuel.

2. A composition as defined in claim 1, wherein the fuel comprises a metal or metal hydride powder.

3. A composition as defined in claim 2, wherein the metal or metal hydride powder is selected from the group consisting of boron, silicon, zirconium hydride, tungsten, and mixtures thereof.

4. A composition as defined in claim 1, wherein the fuel comprises an organic fuel.

5. A composition as defined in claim 4, wherein the organic fuel is selected from the group consisting of hexamine, melamine, uric acid, guanine, guanidine, adenine, and mixtures thereof.

6. A composition as defined in claim 1, further comprising a binder in addition to the fuel.

7. A composition as defined in claim 1, further comprising a burn rate modifier.

8. A composition which emits infrared light upon burning comprising:

an infrared emitting material selected from the group consisting of cesium nitrate, rubidium nitrate, and mixtures thereof, said infrared emitting material being present from about 10% to about 20% by weight;

ammonium nitrate present from about 45% to about 65% by weight;

a binder present from about 5% to about 20% by weight; and a fuel.

9. A composition as defined in claim 8, wherein the fuel comprises at least one metal or metal hydride powder selected from the group consisting of boron, zirconium hydride, silicon, tungsten, and mixtures thereof.

10. A composition as defined in claim 9, wherein the metal or metal hydride powder comprises from about 6% to about 12% by weight of the composition.

11. A composition as defined in claim 8, wherein the fuel comprises an organic fuel.

12. A composition as defined in claim 8, wherein the organic fuel is selected from the group consisting of hexamine, melamine, uric acid, guanine, guanidine, adenine, and mixtures thereof.

13. A composition as defined in claim 8, wherein the binder is selected from the group consisting of polyesters, polyethers, polyamines, and polyamides.

14. A composition as defined in claim 8, wherein the binder comprises vinyl alcohol-acetate resin.

15. A composition as defined in claim 8, wherein the binder is curable.

16. A composition as defined in claim 15, wherein the binder contains a polyester resin and an epoxy resin.

17. A composition as defined in claim 8, further comprising a burn rate modifier.

18. A composition as defined in claim 17, wherein the burn rate modifier comprises up to about 2% by weight of the composition.

19. A composition as defined in claim 17, wherein the burn rate modifier is selected from the group consisting of iron oxide, aluminum, magnesium, and mixtures thereof.

20. An infrared illuminant composition which emits infrared light upon burning comprising:

an infrared emitting material selected from the group consisting of cesium nitrate, rubidium nitrate, and mixtures thereof, said infrared emitting material being present from about 10% to about 20% by weight;

an ammonium nitrate oxidizer present from about 45% to about 65% by weight;

a binder present from about 5% to about 20% by weight;

metal or metal hydride powder present from about 6% to about 12% by weight, said metal powder being selected from the group consisting of boron, zirconium hydride, silicon, tungsten, and mixtures thereof; and an organic fuel present from about 10% to about 20% by weight, said organic fuel being selected from the group consisting of hexamine, melamine, uric acid, guanine, guanidine, adenine, and mixtures thereof.

21. An infrared illuminant composition as defined in claim 20, further comprising from about 5% to about 10% by weight of nitramine oxidizer.

22. An infrared illuminant composition as defined in claim 20, wherein the binder comprises materials selected from the group consisting of polyesters, polyethers, polyamines, and polyamides.

23. An infrared illuminant composition as defined in claim 20, wherein the binder comprises vinyl alcohol-acetate resin.

24. An infrared illuminant composition as defined in claim 20, wherein the binder is curable.

25. An infrared illuminant composition as defined in claim 24, wherein the binder contains a polyester resin and an epoxy resin.

26. An infrared illuminant composition as defined in claim 20, further comprising a burn rate modifier.

27. An infrared illuminant composition as defined in claim 26, wherein the burn rate modifier is selected from the group consisting of compounds of iron, aluminum, magnesium, and mixtures thereof.

* * * * *